US012601874B2

(12) United States Patent
Beaupré-Laflamme et al.

(10) Patent No.: US 12,601,874 B2
(45) Date of Patent: Apr. 14, 2026

(54) MANAGING TEMPERATURES IN INTEGRATED CIRCUITS

(71) Applicant: Ciena Corporation, Hanover, MD (US)

(72) Inventors: Raphael Beaupré-Laflamme, Quebec (CA); Lam Nguyen, Québec (CA)

(73) Assignee: Ciena Corporation, Hanover, MD (US)

( * ) Notice: Subject to any disclaimer, the term of this patent is extended or adjusted under 35 U.S.C. 154(b) by 377 days.

(21) Appl. No.: 18/173,301

(22) Filed: Feb. 23, 2023

(65) Prior Publication Data

US 2024/0288633 A1      Aug. 29, 2024

(51) Int. Cl.
*G02B 6/13* (2006.01)
*G02B 6/42* (2006.01)

(52) U.S. Cl.
CPC ............. *G02B 6/13* (2013.01); *G02B 6/4239* (2013.01); *G02B 6/4269* (2013.01)

(58) Field of Classification Search
CPC ....... G02B 6/13; G02B 6/4239; G02B 6/4269
See application file for complete search history.

(56) References Cited

U.S. PATENT DOCUMENTS 10,775,559 B2     9/2020   Watts et al.
10,866,376 B1 *  12/2020   Ghiasi .................. G02B 6/4246

12,332,490 B2 *   6/2025   Kim ...................... G02B 6/4238
2016/0380168 A1 *  12/2016   Han ................... H10H 20/8506
174/255
2023/0121954 A1 *   4/2023   Lin ...................... H01S 5/02469
372/34

OTHER PUBLICATIONS ip.com: "Encapsulating thermal interface for hybrid integration in Silicon Photonics", Prior Art Database, Oct. 25, 2020, pp. 1-7, Retrieved from Internet URL: https://ip.com/IPCOM/000263947.

* cited by examiner

*Primary Examiner* — Tina Wong
(74) *Attorney, Agent, or Firm* — Young Basile Hanlon & MacFarlane, P.C.

(57) ABSTRACT

An article of manufacture comprises: a first integrated circuit, with a cavity formed through an entire thickness between a first surface of the first integrated circuit and a second surface of the first integrated circuit; a second integrated circuit having a size such that at least a portion of the second integrated circuit fits within at least a portion of the cavity; and a thermally conductive structure mechanically connected to the second surface of the first integrated circuit and mechanically connected to a surface of the second integrated circuit. A feature of the first integrated circuit and a feature of the second integrated circuit are positioned at respective distances from a reference plane intersecting a portion of the thermally conductive structure, such that the distances remain substantially equal to each other at each of a plurality of temperatures within a predetermined operating temperature range.

17 Claims, 7 Drawing Sheets

MANAGING TEMPERATURES IN INTEGRATED CIRCUITS

TECHNICAL FIELD

This disclosure relates to managing temperatures in integrated circuits.

BACKGROUND

Complementary metal-oxide-semiconductor (CMOS) and other fabrication techniques are generally used to fabricate electronic integrated circuits (EICs), which operate using electrical signals (e.g., voltage signals and/or current signals). Similar fabrication techniques can be used to fabricate photonic integrated circuits (PICs) in SiPhot or other photonic platforms. PICs often include optical waveguides for transporting optical waves to and from photonic devices. An optical waveguide is a structure that confines and guides the propagation of an electromagnetic wave. When different integrated circuits (ICs, including EICs and/or PICs) are combined, managing the flow of temperature (e.g., to reduce thermal crosstalk) can be challenging.

SUMMARY

In one aspect, in general, an article of manufacture comprises: a first integrated circuit comprising a first surface and a second surface, with a cavity formed through an entire thickness between the first surface of the first integrated circuit and the second surface of the first integrated circuit; a second integrated circuit comprising a first surface and a second surface and having a size such that at least a portion of the second integrated circuit fits within at least a portion of the cavity; and a thermally conductive structure mechanically connected to the second surface of the first integrated circuit and mechanically connected to the second surface of the second integrated circuit. A feature of the first integrated circuit and a feature of the second integrated circuit are positioned at respective distances from a reference plane intersecting a portion of the thermally conductive structure, such that the distances remain substantially equal to each other at each of a plurality of temperatures within a predetermined operating temperature range.

In another aspect, in general, a method comprises: forming a cavity through a first integrated circuit comprising a first surface and a second surface, with the cavity formed through an entire thickness between the first surface of the first integrated circuit and the second surface of the first integrated circuit; receiving a second integrated circuit comprising a first surface and a second surface and having a size such that at least a portion of the second integrated circuit fits within at least a portion of the cavity; and mechanically connecting a thermally conductive structure to the second surface of the first integrated circuit and to the second surface of the second integrated circuit. A feature of the first integrated circuit and a feature of the second integrated circuit are positioned at respective distances from a reference plane intersecting a portion of the thermally conductive structure, such that the distances remain substantially equal to each other at each of a plurality of temperatures within a predetermined operating temperature range.

Aspects can include one or more of the following features.

A first weighted average of coefficients of thermal expansion of materials between the feature of the first integrated circuit and the reference plane is substantially equal to a second weighted average of coefficients of thermal expansion of materials between the feature of the second integrated circuit and the reference plane.

Respective weights of the first weighted average are respective thicknesses of the materials between the feature of the first integrated circuit and the reference plane, and respective weights of the second weighted average are respective thicknesses of the materials between the feature of the second integrated circuit and the reference plane.

A sum of the respective thicknesses of the materials between the feature of the first integrated circuit and the reference plane is substantially equal to a sum of the respective thicknesses of the materials between the feature of the second integrated circuit and the reference plane.

The thermally conductive structure is mechanically connected to the second surface of the second integrated circuit by a first adhesive located between (1) a first surface of the thermally conductive structure that is within the cavity and (2) the second surface of the second integrated circuit.

The thermally conductive structure is mechanically connected to the second surface of the first integrated circuit by a second adhesive located between (1) a second surface of the thermally conductive structure that is outside the cavity and (2) the second surface of the first integrated circuit.

A thermal conductivity of the first adhesive is higher than a thermal conductivity of the second adhesive by at least a factor of 2.

The reference plane is a plane between the second adhesive and the second surface of the thermally conductive structure.

The thermally conductive structure comprises a single thermally conductive material.

The thermally conductive structure comprises a first thermally conductive material bonded to a second thermally conductive material.

The reference plane is a plane at which the first thermally conductive material is bonded to the second thermally conductive material.

The feature of the first integrated circuit comprises a first waveguide, and the feature of the second integrated circuit comprises a second waveguide.

The article of manufacture of claim further comprises a temperature control system in thermal contact with the thermally conductive structure.

The temperature control system comprises at least one of a heat sink, or a thermo-electric cooler.

Aspects can have one or more of the following advantages.

Managing temperatures in integrated circuits can improve one or more of their performance characteristics. An integrated thermal management structure (ITMS) can reduce the power requirement of thermal control systems by selectively controlling the temperature of select chips or portions of chips. In some examples, the ITMS can be constructed in a substantially athermal design, which can help maintain alignment (e.g., optical alignment) between thermally isolated chips or portions of chips. When PICs are combined, maintaining optical alignment can help to save optical power. The athermal ITMS can also reduce strains across one or more chips or one or more sections of a chip, reducing the risks of structural failure.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
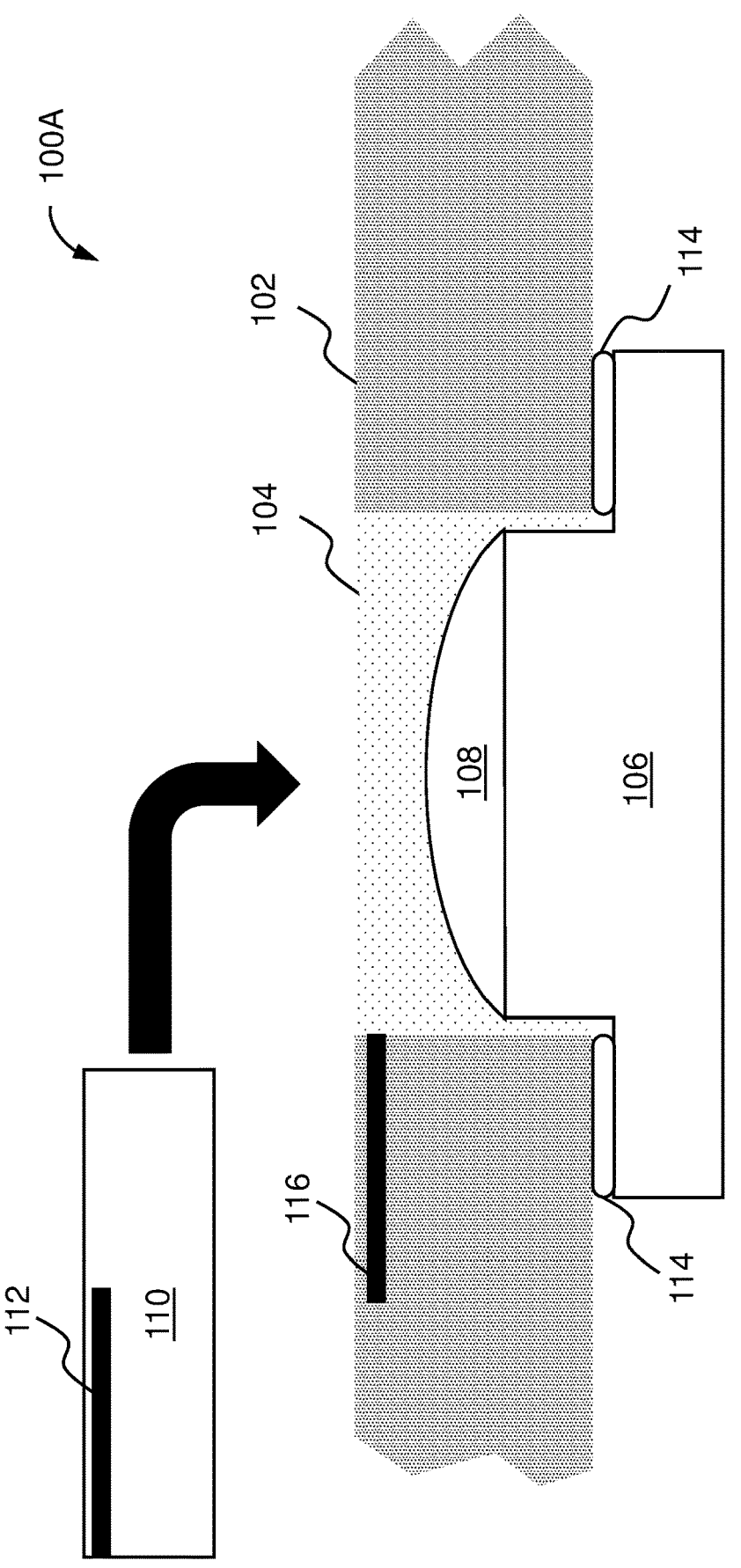
FIG. 1A is a schematic diagram of an integrated thermal management structure during assembly.

As electrical and opto-electrical devices increase in complexity due to co-packaging and hybrid integration, designers are often faced with the challenge of integrating several IC chips in a single device while having to optimize the thermal management to reduce power consumption. As the thermal density of some chips has increased, thermal management has become a greater challenge for some integrated circuits.

In high powered multi-IC chip devices, it can be desirable to control the operating temperature of certain components via a cooling system (e.g., thermo-electric coolers (TECs) and/or passive heatsinks). Due to the limited space available in packages, it is often not possible to have a cooling device with the required size to dissipate the heat load. In some examples, cooling is only applied to the local area(s) where temperature control is critical. However, this is often not possible due to high integration level of these IC chips, as can be found in 2.5D & 3D packaging.

Some thermal control systems may be attached to the top portion of a smaller thermally controlled IC, where the thermally controlled IC is connected to a larger IC chip that may be thermally controlled in a different manner than the thermally controlled IC or may not be thermally controlled at all. For example, heat flow may be directed upward through an integrated heat sink (IHS) or another thermal control system by using a thermal interface material (TIM) to accommodate the height variation of the mechanical stack-up comprising the smaller chip and the larger chip, in addition to other components. Due at least in part to the height variation of the mechanical stack-up, the bond line thickness (BLT) of the TIM to connect the smaller IC to the thermal control system may impact the thermal performance of the module negatively by increasing the thermal resistivity. An increased height variation of the mechanical stack-up may require an increased BLT thickness, and therefore an increased thermal resistivity that reduces the ability of the thermal control system to thermally control the smaller IC.

Other thermal control systems may extract heat from the smaller IC and redirect the heat flow into the larger IC, which may be operating at a lower temperature. Such a thermal control system may produce thermal cross talk between the larger IC and the smaller IC, which may be undesirable. In such a configuration, independent temperature control of each IC may be difficult, which can be a disadvantage when the different ICs are designed to operate at different respective temperatures. Thermal crosstalk may also add a higher cooling power requirement, since it may not be possible to change the temperature of one IC without impacting the other.

The integrated thermal management structure (ITMS) disclosed herein may be used to locally cool one or more IC chips, referred to herein as companion chips, which may be integrated into one or more larger IC chips, referred to herein as host chips. In some examples, local cooling may be applied substantially to a companion chip, such that the cooling system is largely isolated from the heat load of a host chip or other thermal sources. The ITMS may include a thermal plug located between the companion chip and a cooling system located on the backside of a host chip. The thermal plug, optionally including one or more slabs that are thermally connected to the thermal plug, may protrude through a cavity that was previously etched in the host chip.

Such a configuration can dissipate the thermal load of the companion chip directly into the cooling system, reducing the thermal crosstalk with the host chip. By avoiding direct thermal contact with the host chip, or substantially mitigating any thermal contact with the host chip, the ITMS provides better cooling to the companion chip.

An ITMS may be used for a companion chip comprising one or more photonic integrated circuits and/or electronic integrated circuits. In some examples, a photonic integrated circuit of the companion chip may be optically coupled to another photonic integrated circuit located on the host chip. In some examples, an integrated circuit of the companion chip may be electronically coupled to another integrated circuit located on the host chip. Or, in some examples, there may be both optical and electronic coupling between integrated circuits on respective host and companion chips.

FIG. 1A shows an example ITMS 100A during an example assembly process. A host chip 102 with a cavity 104 has a portion of a thermal plug 106 located within the cavity 104. A thermally conductive adhesive 108 (e.g., having a relatively high thermal conductivity) is located on top of the thermal plug 106. A companion chip 110 is in the process of being placed on top of the thermally conductive adhesive 108 and includes one or more companion chip waveguides 112. One or more layers of thermally isolating adhesive 114 (e.g., having a relatively low thermal conductivity) are located between the thermal plug 106 and the host chip 102. The thermally isolating adhesive 114 can be used to reduce the amount of thermal coupling between the host chip 102 and the thermal plug 106. In some examples, the thermally isolating adhesive 114 may be used to ensure adequate thermal management of the companion chip 110 by reducing the thermal load of the host chip 102 on the thermal plug 106. In other examples, the thermally isolating adhesive 114 may reduce the effects of the thermal plug 106 on the host chip 102 such that the host chip 102 can be maintained at a temperature without influence from the thermal plug 106. The host chip 102 includes one or more host chip waveguides 116. Both the host chip 102 and the companion chip 110 can include electrical and photonic integrated circuits.

By choosing the properties and thicknesses of materials of the ITMS to be substantially athermal, it is possible to mitigate the effects of thermal expansion and contraction on optical alignment between a host chip and a companion chip, and to reduce the mechanical stress of the ITMS. The thermal plug can be dimensioned and the material(s) chosen to match the coefficient of thermal expansion (CTE) stack-up of the host chip, the companion chip, and the adhesive bond lines. The ITMS design may accommodate different adhesive thicknesses. In some examples, the materials composing the host chip and the companion chip can have thermal coefficient of similar values (for reference: Si=3 ppm/C, InP=4.5 ppm/C, GaN=3.2 ppm/C, where ppm/C is parts per million per degree Celsius, such that the expansion in a particular dimension is approximately proportional to both the starting thickness in that dimension and the change in temperature over the course of that expansion). The thermal plug may be composed of a material similar to the host and companion chips (e.g., etched Si), such that the ITMS can be highly stable. In practice, such an example could be substantially athermal, with possibly sub-micron thermal misalignment between the waveguides or other chip features being aligned.

Figure 1B:
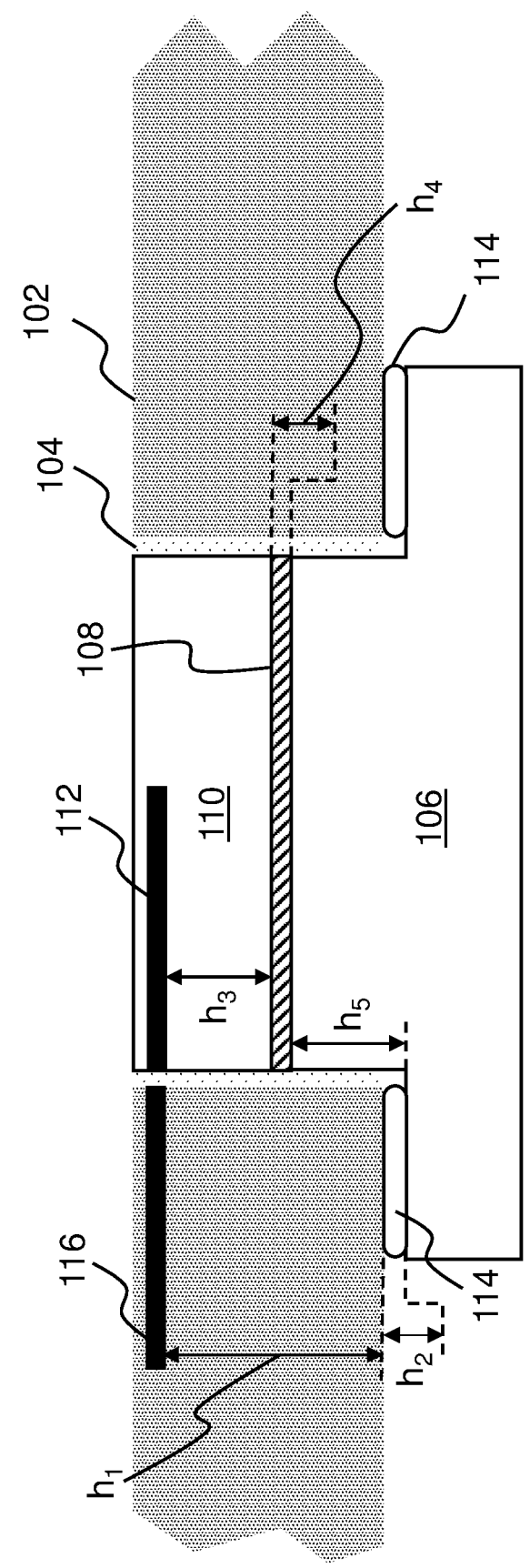
FIG. 1B is a schematic diagram of an integrated thermal management structure.

FIG. 1B shows an example ITMS 100B after assembly. The companion chip 110 is adhered to the top of the thermally conductive adhesive 108 and includes one or more companion chip waveguides 112 that are optically coupled to one or more host chip waveguides 116. Height $h_1$ denotes the distance between the bottom of the host chip 102 and the host chip waveguide 116. Height $h_2$ denotes the thickness of the thermally isolating adhesive 114. Height $h_3$ denotes the distance between the bottom of the companion chip 110 and the companion chip waveguide 112. Height $h_4$ denotes the thickness of the thermally conductive adhesive 108. Height $h_5$ denotes the distance between the bottom of the thermally isolating adhesive 114 and the top of the thermal plug 106. The heights are chosen such that the companion chip waveguides 112 are initially aligned with the host chip waveguides 116. For example, heights may be chosen such that they approximately fulfill the following equation at a particular temperature within an operating temperature range: $h_1+h_2=h_3+h_4+h_5$. The coefficients of thermal expansion of these materials can be selected so that, as the heights expand or contract with increasing or decreasing temperature, the companion chip waveguides 112 remain substantially aligned with the host chip waveguides 116. For the equations provided below, the coefficient of thermal expansion for the host chip 102 is denoted by $\alpha_1$. The coefficient of thermal expansion for the thermally isolating adhesive 114 is denoted by $\alpha_2$. The coefficient of thermal expansion for the companion chip 110 is denoted by $\alpha_3$. The coefficient of thermal expansion for the thermally conductive adhesive 108 is denoted by $\alpha_4$. The coefficient of thermal expansion for the thermal plug 106 is denoted by $\alpha_5$. Materials may be chosen such that the resulting coefficients of thermal expansion ($\alpha_1$, $\alpha_2$, $\alpha_3$, $\alpha_4$, $\alpha_5$), together with chosen fabrication distances ($h_1$, $h_2$, $h_3$, $h_4$, $h_5$), constitute a ITMS that is substantially athermal. For example, the coefficients of thermal expansion and the fabrication distances can be designed such that the host waveguide chip 116 maintains optical alignment with the companion chip waveguide 112. The parameters may be chosen such that they approximately fulfill the following equation:

$$\alpha_1 \cdot h_1 + \alpha_2 \cdot h_2 = \alpha_3 \cdot h_3 + \alpha_4 \cdot h_4 + \alpha_5 \cdot h_5$$

Together these equations represent a condition that can be described as a first weighted average of coefficients of thermal expansion of materials between the host chip waveguide 116 and a reference plane being substantially equal to a second weighted average of coefficients of thermal expansion of materials between the companion chip waveguide 112 and the reference plane. The location of the reference plane in this example is based on where the stacks of material share a common portion of the thermal plug 106 as their base (i.e., the bottom of the thermally isolating adhesive 114 in this example). Non-uniform changes in temperature, for example, if the temperature of the host chip 102 were to change by a different amount than the companion chip 110, may lead to a different equation that can be used for selection of design parameters.

In other examples, the thermal plug can be composed of two or more different materials with pre-determined thicknesses. For example, a slab connected to a thermal plug and the thermal plug itself may together have a composite thermal coefficient, which may be determined or modified by the choice of materials and/or by calculating the thicknesses of layers, thermally conductive adhesives, and bond lines.

Figure 1C:
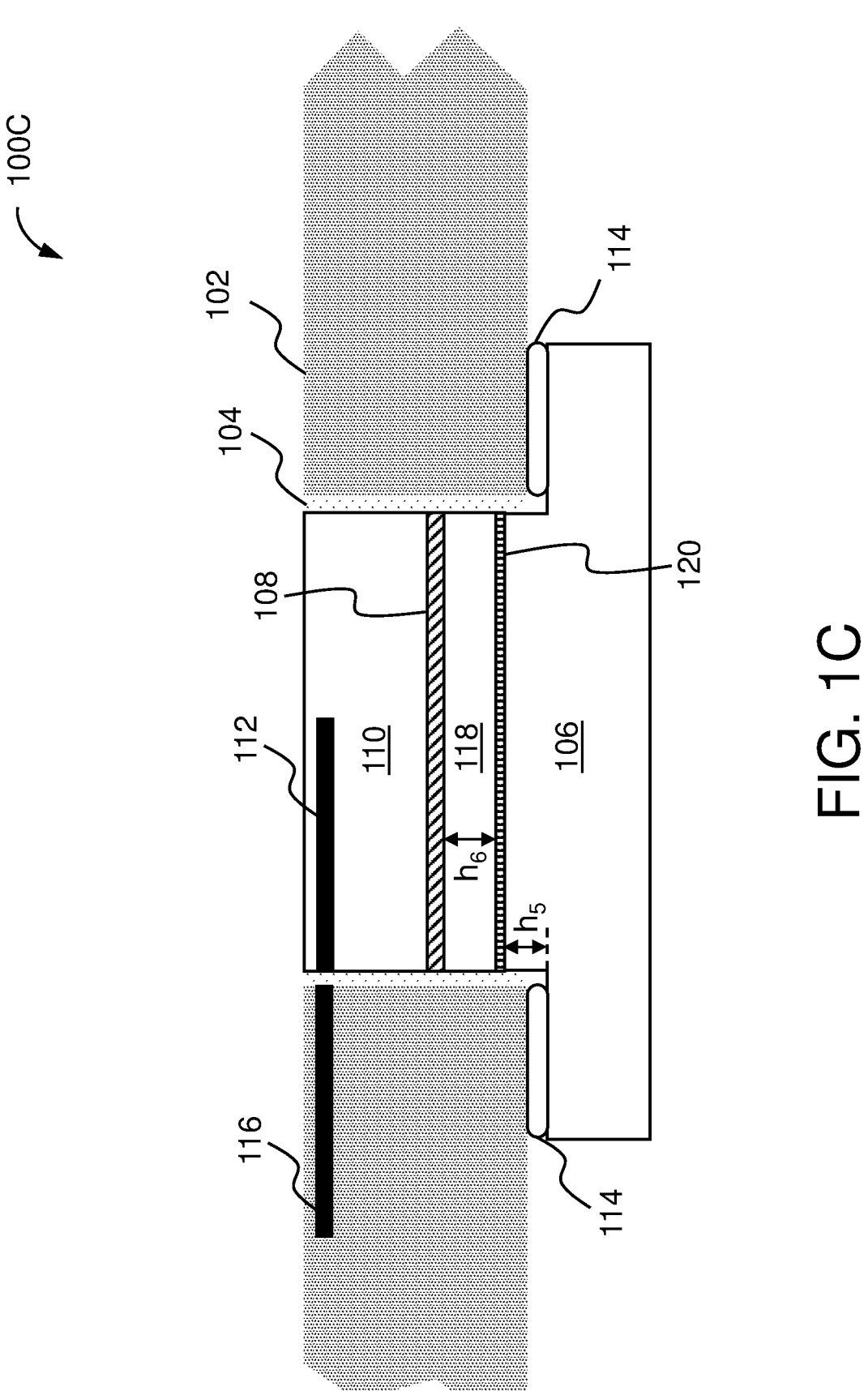
FIG. 1C is a schematic diagram of an integrated thermal management structure.

FIG. 1C shows an example ITMS 100C. A slab 118, with a thickness of $h_6$ and a coefficient of thermal expansion denoted by $\alpha_6$, is located between the companion chip 110 and the thermal plug 106. A bond line 120 binds the slab 118 to the thermal plug 106. In some examples, the bond line 120 is thin, such that it's coefficient of thermal expansion can be neglected in a calculation for athermal design parameters. In other examples, the thickness of the bond line 120 may be used in a calculation for athermal design parameters. The parameters of the ITMS 100C may be chosen such that they approximately fulfill the following equation comprising a sum:

$$\alpha_1 \cdot h_1 + \alpha_2 \cdot h_2 = \alpha_3 \cdot h_3 + \alpha_4 \cdot h_4 + \alpha_5 \cdot h_5 + \alpha_6 \cdot h_6$$

where the heights and coefficients with subscripts 1, 2, 3, and 4 are defined as shown in FIG. 1B, and the heights and coefficients with subscripts 5 and 6 are defined as shown in FIG. 1C. As in FIG. 1B, non-uniform changes in temperature may lead to a different equation. In some examples, the thickness of the slab 118, together with its thermal coefficient of expansion, can provide an additional design parameter to more easily make an athermal ITMS 100C with materials and fabrication parameters that are less constrained than they may otherwise be without the slab 118.

Figure 1D:
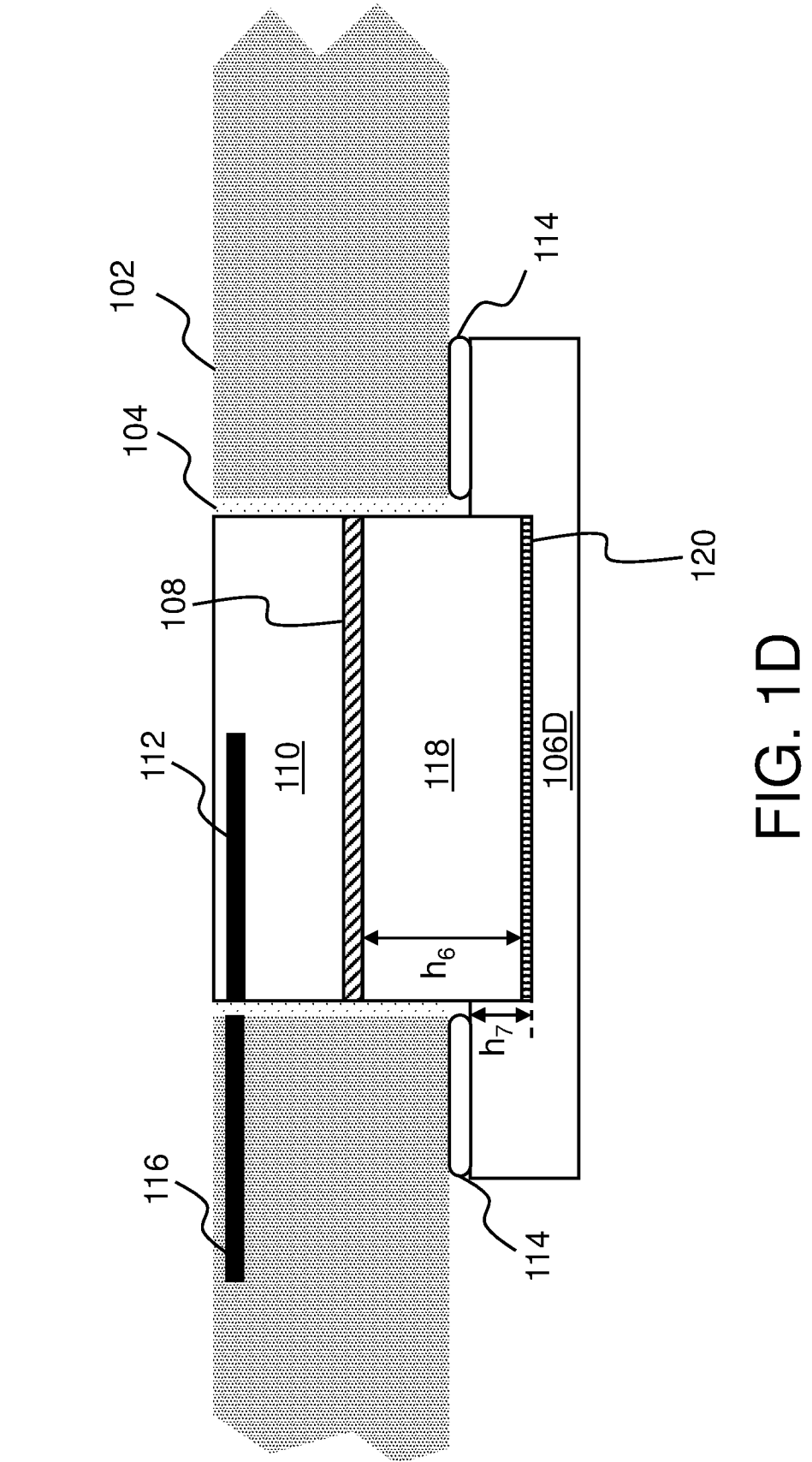
FIG. 1D is a schematic diagram of an integrated thermal management structure.

FIG. 1D shows an example ITMS 100D comprising a thermal plug 106D with a recessed portion. The slab 118 is adhered to the recessed portion of the thermal plug 106D using the bond line 120. Height $h_7$ denotes the distance between the bottom of the thermally isolating adhesive 114 and the bottom of the slab 118. The parameters of the ITMS 100D may be chosen such that they approximately fulfill the following equation:

$$\alpha_1 \cdot h_1 + \alpha_2 \cdot h_2 + \alpha_5 \cdot h_7 = \alpha_3 \cdot h_3 + \alpha_4 \cdot h_4 + \alpha_6 \cdot h_6$$

where the heights and coefficients with subscripts 1, 2, 3, and 4 are defined as shown in FIG. 1B, and the heights and coefficients with subscripts 6 and 7 are defined as shown in FIG. 1D. As in FIG. 1B, non-uniform changes in temperature may lead to a different equation. The location of the reference plane in this example is based on where the stacks of material share a common portion of the thermal plug 106D as their base (i.e., the bond line 120 in this example).

Figure 1E:
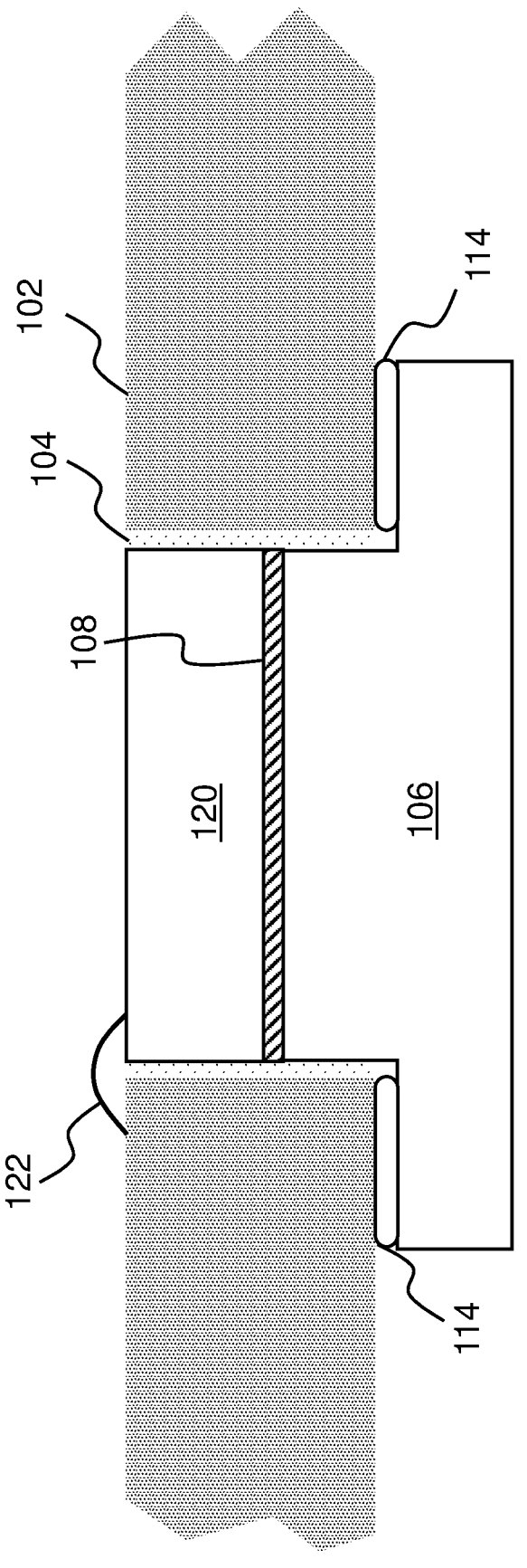
FIG. 1E is a schematic diagram of an integrated thermal management structure.

In some examples, another feature of IC chips other than waveguides may need to have their alignment maintained as temperature changes over an operating range. For example, the features may include other optical components that may need to maintain alignment (e.g., spot size converters, reflectors, or lenses), or electronic components that may need to maintain alignment (e.g., conductive contacts, or wirebonds). FIG. 1E shows an example ITMS 100K. An electronic companion chip 120 comprises an electronic integrated circuit that are coupled to an electronic integrated circuit in the host chip 102 using a wirebond 122. In this example, it is helpful to have an athermal ITMS to avoid significant tension in the relatively short wirebond 122, which could cause the wirebond 122 to break or cause one or both ends of the wirebond to be pulled away from the surface of the chips.

Figure 2A:
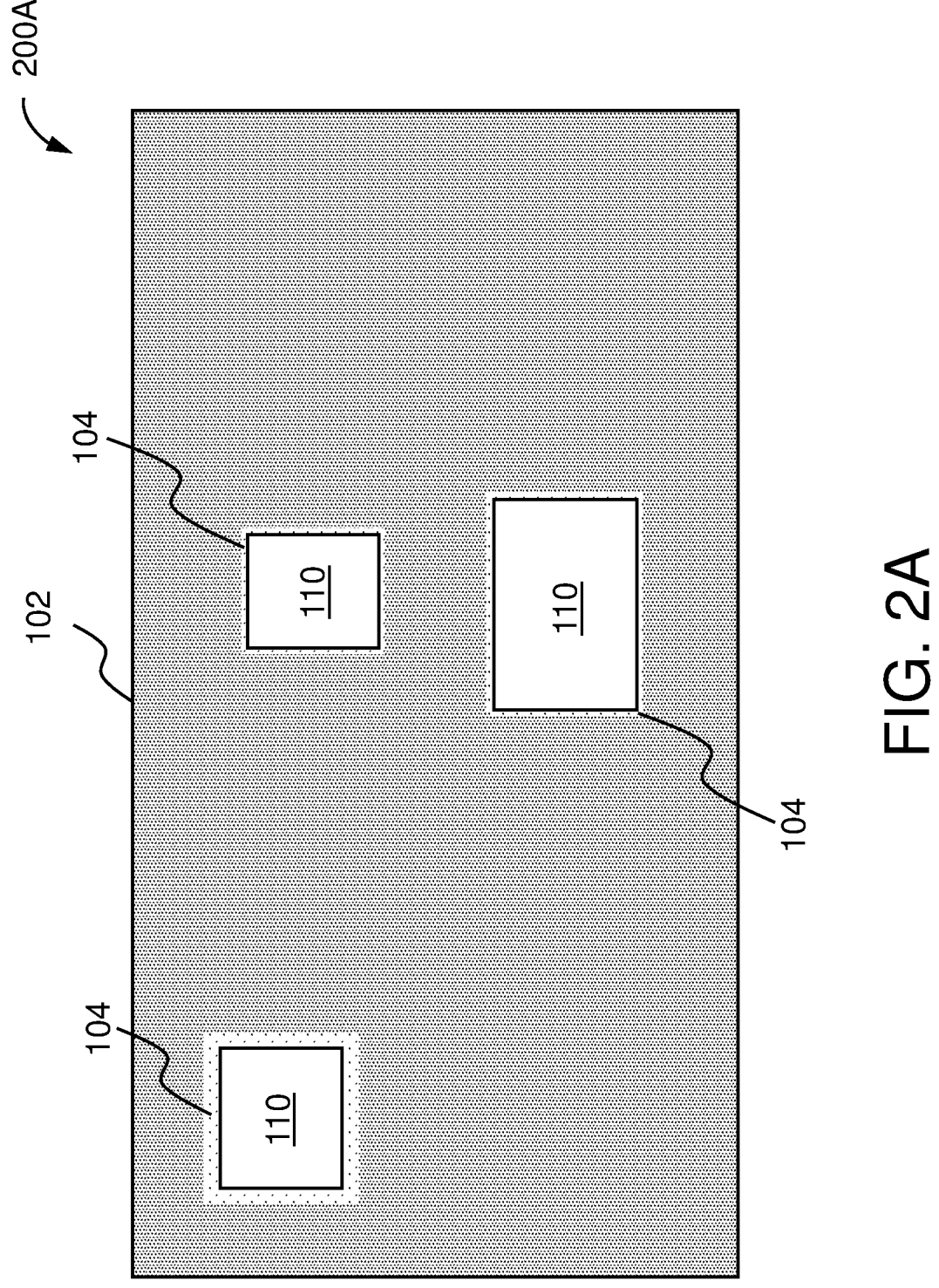
FIG. 2A is a schematic diagram of an integrated thermal management structure, viewed from above.

FIG. 2A shows an example ITMS 200A viewed from above. The host chip 102 comprises several cavities 104 and the top portions of the companion chips 110 mounted into the cavities 104 are visible in this view. The cavities 104 are surrounded by host chip 102 on four sides in this example.

Figure 2B:
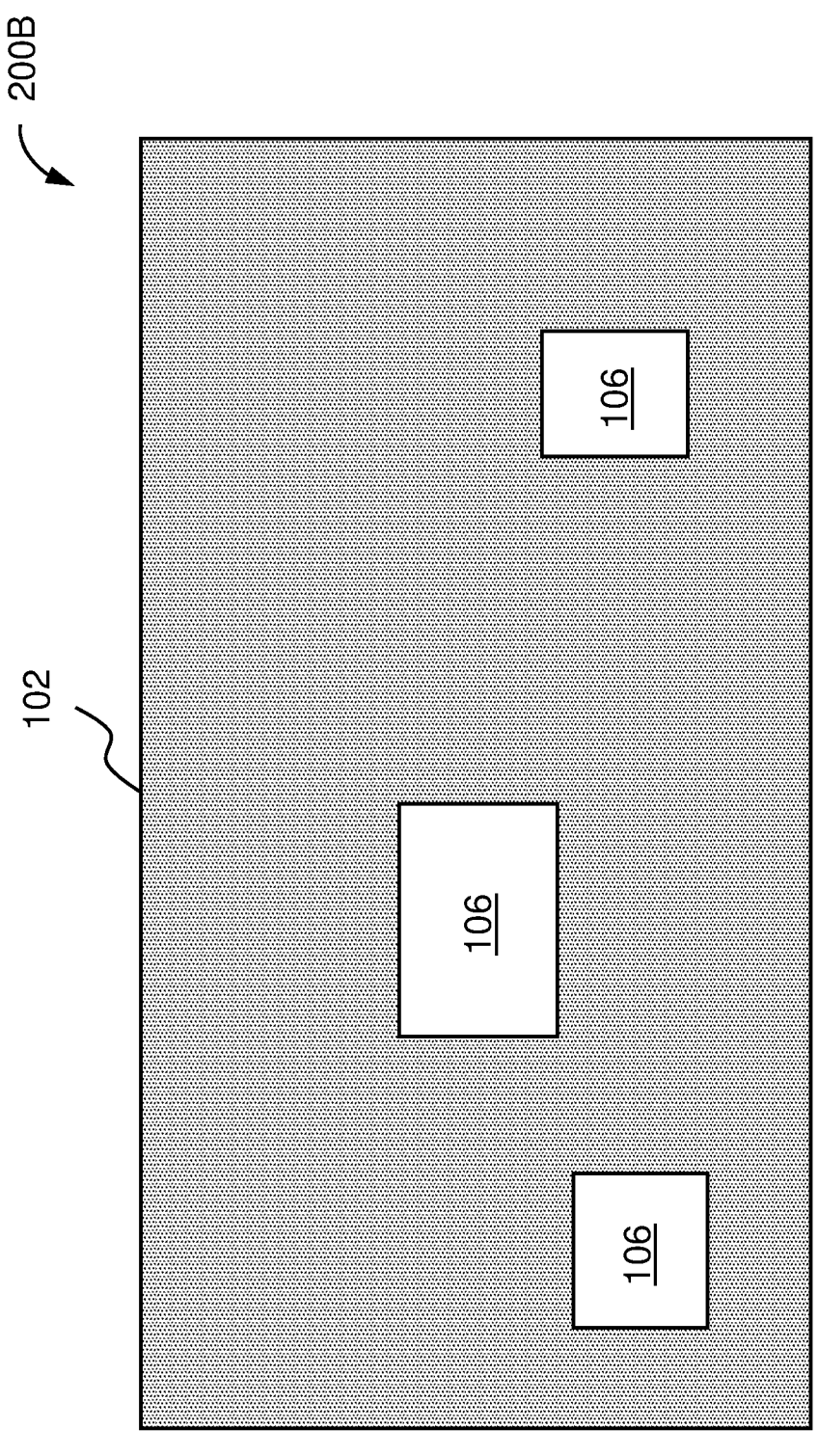
FIG. 2B is a schematic diagram of an integrated thermal management structure, viewed from below.

FIG. 2B shows an example ITMS 200B viewed from below. The bottom portions of the thermal plugs 106 are visible in this view, and can be connected to one or more thermal control systems.

In some example ITMSs, thermally sinking the companion IC through a cavity in the host IC can substantially mitigate thermal crosstalk between the two ICs due to the absence of surface contact between the two. Therefore, it may be possible to control the temperature of the companion IC without substantially impacting the temperature of the host IC. In addition, a lower cooling power may be required due to thermal contact being localized to the companion IC only (i.e., the cooling system only sinks the local heat flow of the companion IC).

Thus, in view of the foregoing description of any apparatus, method, article of manufacture, or system, and corresponding portions of the drawings referenced from the figures, it should be understood by a person of ordinary skill in the art, that in one aspect, in general, an article of manufacture comprises: a first integrated circuit, with a cavity formed through an entire thickness between a first surface of the first integrated circuit and a second surface of the first integrated circuit; a second integrated circuit having a size such that at least a portion of the second integrated circuit fits within at least a portion of the cavity; and a thermally conductive structure mechanically connected to the second surface of the first integrated circuit and mechanically connected to a surface of the second integrated circuit. A feature of the first integrated circuit and a feature of the second integrated circuit are positioned at respective distances from a reference plane intersecting a portion of the thermally conductive structure, such that the distances remain substantially equal to each other at each of a plurality of temperatures within a predetermined operating temperature range.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An article of manufacture, comprising:
a first integrated circuit comprising a first surface and a second surface, with a cavity formed through an entire thickness, along a first axis, between the first surface of the first integrated circuit and the second surface of the first integrated circuit;
a second integrated circuit comprising a first surface and a second surface and having a size such that at least a portion of the second integrated circuit fits within at least a portion of the cavity; and
a plug structure connected to the second surface of the first integrated circuit and connected to the second surface of the second integrated circuit;

where a feature of the first integrated circuit and a feature of the second integrated circuit are positioned at respective distances from a reference plane intersecting a portion of the plug structure, such that the distances remain substantially equal to each other at each of a plurality of temperatures within a predetermined operating temperature range; and
where the feature of the first integrated circuit comprises a first waveguide, and the feature of the second integrated circuit comprises a second waveguide.

2. The article of manufacture of claim 1, where a first weighted average of coefficients of thermal expansion of materials between the feature of the first integrated circuit and the reference plane is substantially equal to a second weighted average of coefficients of thermal expansion of materials between the feature of the second integrated circuit and the reference plane, and where respective weights of the first weighted average are proportional to respective thicknesses of the materials between the feature of the first integrated circuit and the reference plane, and respective weights of the second weighted average are proportional to respective thicknesses of the materials between the feature of the second integrated circuit and the reference plane.

3. The article of manufacture of claim 2, where a sum of the respective thicknesses of the materials between the feature of the first integrated circuit and the reference plane is substantially equal to a sum of the respective thicknesses of the materials between the feature of the second integrated circuit and the reference plane.

4. The article of manufacture of claim 1, where the plug structure is connected to the second surface of the second integrated circuit by a first adhesive located between (1) a first surface of the plug structure that is within the cavity and (2) the second surface of the second integrated circuit.

5. The article of manufacture of claim 4, where the plug structure is connected to the second surface of the first integrated circuit by a second adhesive located between (1) a second surface of the plug structure that is outside the cavity and (2) the second surface of the first integrated circuit.

6. The article of manufacture of claim 5, where a thermal conductivity of the first adhesive is higher than a thermal conductivity of the second adhesive by at least a factor of 2.

7. The article of manufacture of claim 5, where the reference plane is a plane between the second adhesive and the second surface of the plug structure.

8. The article of manufacture of claim 1, where the plug structure comprises a single thermally conductive material.

9. The article of manufacture of claim 1, where the plug structure comprises a first thermally conductive material bonded to a second thermally conductive material.

10. The article of manufacture of claim 9, where the reference plane is a plane at which the first thermally conductive material is bonded to the second thermally conductive material.

11. The article of manufacture of claim 1, further comprising a temperature control system in thermal contact with the plug structure.

12. The article of manufacture of claim 11, wherein the temperature control system comprises at least one of a heat sink, or a thermo-electric cooler.

13. A method, comprising:
forming a cavity through a first integrated circuit comprising a first surface and a second surface, with the cavity formed through an entire thickness, along a first axis, between the first surface of the first integrated circuit and the second surface of the first integrated circuit;

receiving a second integrated circuit comprising a first surface and a second surface and having a size such that at least a portion of the second integrated circuit fits within at least a portion of the cavity; and connecting a plug structure to the second surface of the first integrated circuit and to the second surface of the second integrated circuit;

where a feature of the first integrated circuit and a feature of the second integrated circuit are positioned at respective distances from a reference plane intersecting a portion of the plug structure, such that the distances remain substantially equal to each other at each of a plurality of temperatures within a predetermined operating temperature range; and where the feature of the first integrated circuit comprises a first waveguide, and the feature of the second integrated circuit comprises a second waveguide.

14. The method of claim 13, where a first weighted average of coefficients of thermal expansion of materials between the feature of the first integrated circuit and the reference plane is substantially equal to a second weighted average of coefficients of thermal expansion of materials between the feature of the second integrated circuit and the reference plane, and where respective weights of the first weighted average are proportional to respective thicknesses of the materials between the feature of the first integrated circuit and the reference plane, and respective weights of the second weighted average are proportional to respective thicknesses of the materials between the feature of the second integrated circuit and the reference plane.

15. The method of claim 14, where a sum of the respective thicknesses of the materials between the feature of the first integrated circuit and the reference plane is substantially equal to a sum of the respective thicknesses of the materials between the feature of the second integrated circuit and the reference plane.

16. The method of claim 13, where the plug structure is connected to the second surface of the second integrated circuit by a first adhesive located between (1) a first surface of the plug structure that is within the cavity and (2) the second surface of the second integrated circuit.

17. The method of claim 16, where the plug structure is connected to the second surface of the first integrated circuit by a second adhesive located between (1) a second surface of the plug structure that is outside the cavity and (2) the second surface of the first integrated circuit.

* * * * *